United States Patent [19]

Chesher

[11] 4,212,360

[45] Jul. 15, 1980

[54] LOAD MEASURING ARRANGEMENTS FOR FORK LIFT TRUCKS OR THE LIKE

[75] Inventor: Keith Chesher, Billericay, England

[73] Assignee: Pye (Electronics Products) Limited, Cambridge, England

[21] Appl. No.: 950,659

[22] Filed: Oct. 12, 1978

[30] Foreign Application Priority Data

Oct. 20, 1977 [GB] United Kingdom ............... 43721/77

[51] Int. Cl.² ..................... G01G 19/08; G01G 19/14; G01G 3/14
[52] U.S. Cl. .................................. 177/139; 177/147; 177/211
[58] Field of Search .................. 177/139, 147, 211

[56] References Cited

U.S. PATENT DOCUMENTS

| | | | |
|---|---|---|---|
| 2,722,411 | 11/1955 | Philbrook | 177/139 X |
| 2,850,181 | 9/1958 | Hamblin | 177/139 X |
| 2,935,213 | 5/1960 | Cellitti et al. | 177/139 X |
| 3,063,576 | 11/1962 | Hofmeister | 177/139 X |
| 3,910,363 | 10/1975 | Airesman | 177/139 |

Primary Examiner—George H. Miller, Jr.
Attorney, Agent, or Firm—Thomas A. Briody; William J. Streeter; Rolf E. Schneider

[57] ABSTRACT

A load weighing system for a fork lift truck uses load cell transducers to measure the compressive forces exerted between a supporting chain or chains which support(s) the load forks and an anchorage point for the chain(s).

3 Claims, 6 Drawing Figures

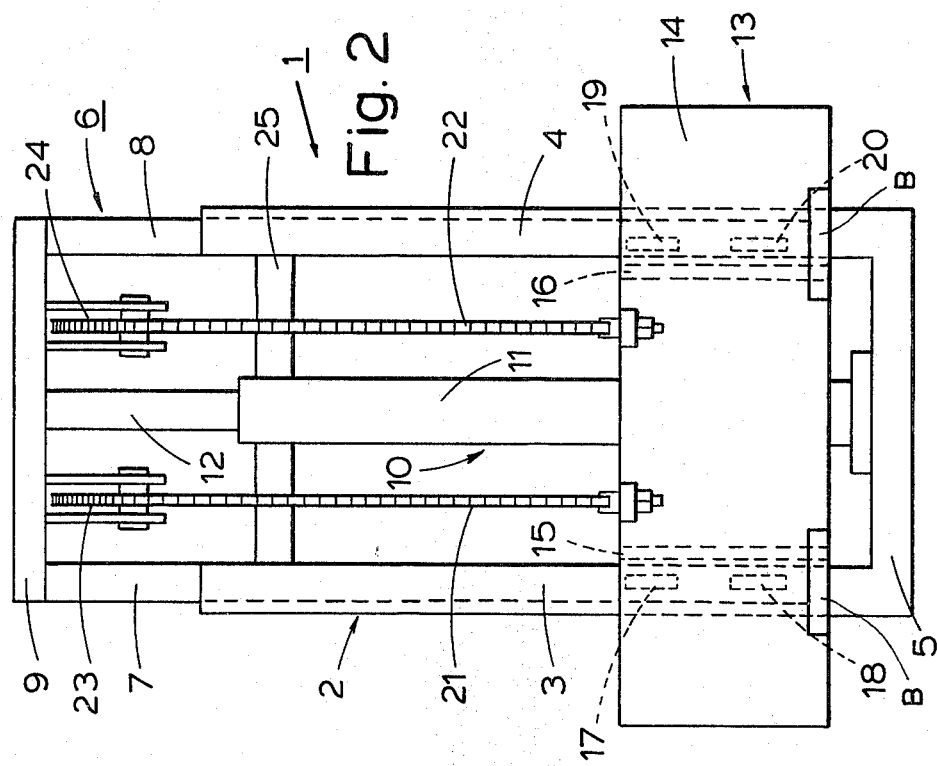
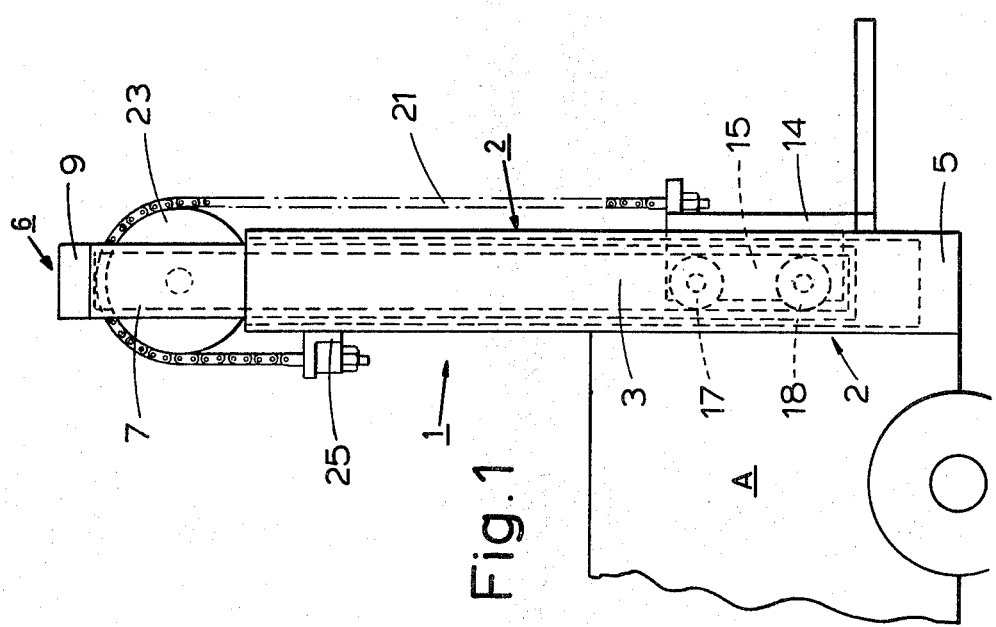

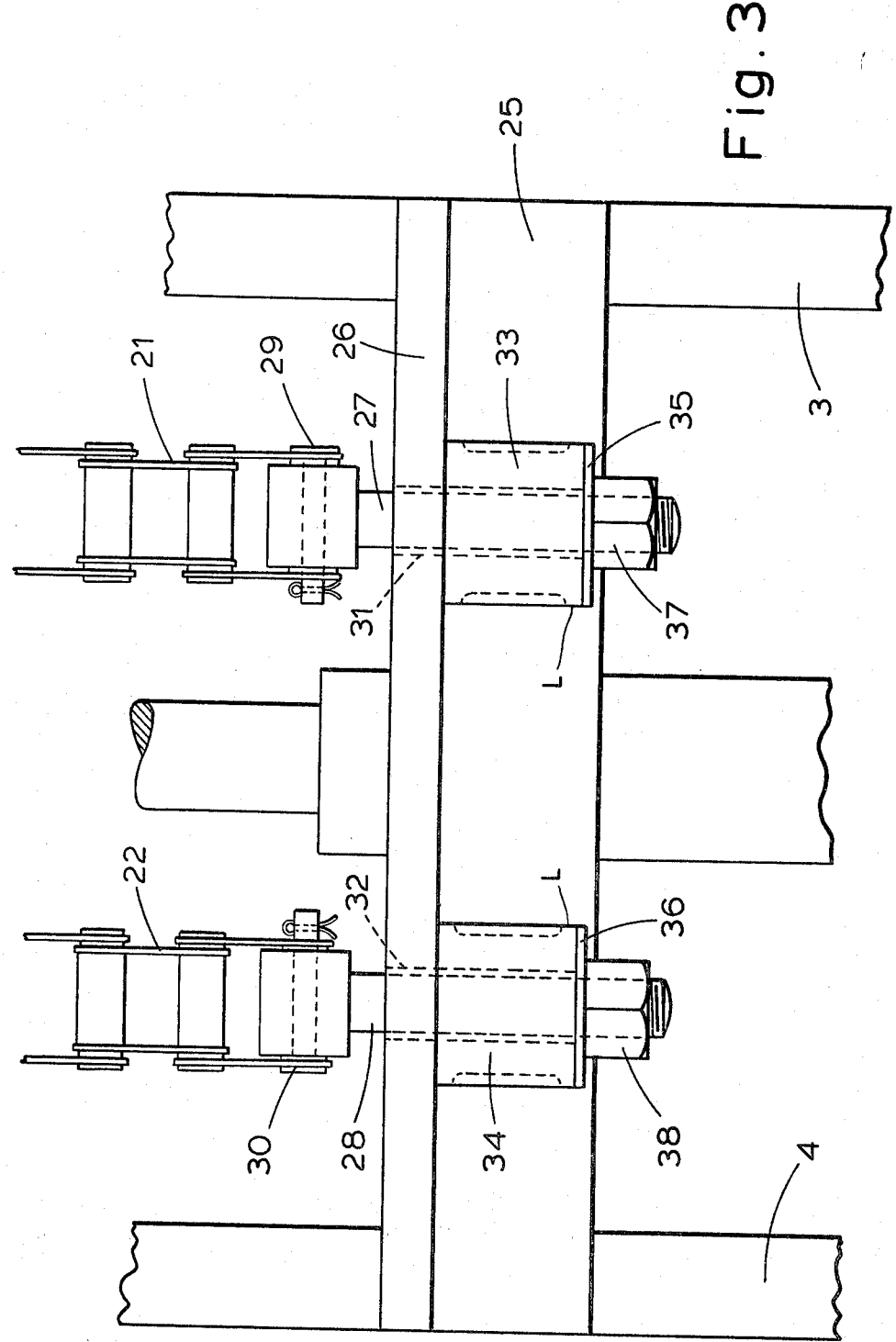

LOAD MEASURING ARRANGEMENTS FOR FORK LIFT TRUCKS OR THE LIKE

This invention relates to a load measuring arrangement for measuring the weight of a load being carried by a fork lift truck or other load-handling device of a kind comprising a fork or other load engaging member mounted on a carriage which is supported on, and arranged for movement parallel to the axis of a substantially vertical mast of the device.

A typical fork lift truck has a telescopic mast comprising at least two sections, of which the bottom section is mounted on a truck chassis. One mast section may be positioned relative to another by, for example, one or more hydraulic rams so as to vary the height of the mast between minimum and maximum limits. A vertically movable carriage is provided with rollers or other guide means for engaging tracks formed in the mast sections so as to guide the carriage for movement parallel to the axis of the mast. The carriage is supported by at least one elongate flexible support member such as a chain, rope, wire, cable or the like, which passes over a sheave mounted adjacent the head of the mast and is secured at one end to the carriage and at the other end to an anchorage point which is fixed to the bottom section of the mast. The arrangement is such that when the mast is at its minimum height, the carriage is in its lowermost position adjacent the foot of the mast. As the mast is extended by the action of the hydraulic ram or rams, the carriage is raised by its support member or members until, when the mast reaches its maximum height, the carriage reaches its highest position adjacent the head of the mast. It will be apparent that any load which is engaged by the fork or other load engaging member mounted on the carriage will be lifted as the carriage is raised up the mast.

Two arrangements are known for measuring the weight of a load being lifted in this manner. One involves measuring the fluid pressure in the hydraulic ram or rams when the fork lift truck is supporting the load. Since the ram or rams must sustain the weights of the movable mast section or sections, the carriage and the fork, in addition to the weight of the load, the proportion of the measured fluid pressure attributable to the load is, in general, small. Moreover, the fluid pressure required is affected by frictional forces between the mast sections as well as between the carriage and the mast. The accuracy with which the weight of the load can be determined by this known arangement is therefore limited.

The other known arrangement involves measuring the tension in the carriage support member or members. Although the tension depends on the weight of the carriage and the fork, in addition to that of the load, and is affected by frictional forces between the carriage and the mast, it is not dependent on the weights of the mast sections or on frictional forces between them. This second known arrangement is therefore capable of greater accuracy than the first.

It has been the practice with the second known arrangement to measure tension in a carriage support member by inserting a tension transducer between an end of the support member and its anchorage point. Typically, the transducer is an elongate body having a first end portion adapted to be connected to an end of the support member, a second end portion adapted to be secured to the anchorage point, and a central portion of lesser cross-sectional area than the end portions, to which are affixed resistance strain gauge elements in such positions as to be responsive to tensile stresses in the central portion. Although transducers of this type are capable of the required accuracy, their use in this manner in a load measuring arrangement for a fork lift truck has the disadvantage that mechanical failure of a transducer will release the support member with which it is associated from its anchorage point with the result that the carriage and any load being lifted will fall. Also, when the load measuring arrangement are fitted to an existing design of fork lift truck, there is the further disadvantages that the length of the carriage support member or members must be reduced to accommodate the transducer or transducers, with a corresponding reduction in the height through which the truck can lift a load; and that special fittings will, in general, be necessary to attach the support member or members to the transducer or transducers and the to the anchorage point or points.

It is an object of the present invention to provide for a load-handling device of the kind referred to, a load measuring arrangement which avoids the above-mentioned disadvantages.

According to the invention, in a load measuring arrangement for a load-handling device of the kind referred to, having carriage support means comprising at least one flexible support member which has one end secured to a first anchorage member fixed in relation to the mast and its other end secured to a second anchorage member fixed to the carriage, there is provided in respect of one of said first and second anchorage members a securing member having a central portion which passes through a clearance or opening provided in the anchorage member, a first end portion adapted to be connected to an end of the flexible support member on one side of the anchorage member and a second end portion of cross-section greater than that of the clearance on the other side of the anchorage member, a load cell transducer which is located between said second end portion and said other side of the anchorage member and is responsive to measure the compressive forces exerted between the securing member and the anchorage member, and means responsive to the load cell transducer measurement to provide an indication of the weight of the load being carried.

With a load measuring arrangement according to the invention, mechanical failure of the load cell transducer will be on a fail-safe basis in that the flexible support member remains secured to the anchorage member by the securing member.

The load cell tranducer may comprise a generally cylindrical body having an axial bore such that the central portion of the securing member passes through the bore with one end face of the body bearing against said other side of the anchorage member and the other end face of the body bearing against said second end portion of the securing member, together with resistive strain gauge elements affixed to the body in such positions as to be responsive to compressive forces applied to the end faces of the body. This form of load cell transducer has the advantage that it is easily threaded into position, with the central portion of the securing member passing through its axial bore.

The securing member may comprise an eye-bolt and nut assembly, the flexible support member being attached to the eye of the bolt, and the nut comprising said second end portion of the securing member. This form of securing member has the advantage that the load cell transducer can easily be fitted to a fork lift truck - without the need for any modification if an eye-bolt and nut assembly is already being used on the truck as the securing member.

The invention will now be described in more detail with reference to the accompanying drawings, of which:

FIGS. 1 and 2 are respective diagrammatic side and front elevational views of a mast for a fork lift truck;

FIG. 3 is a more detailed diagrammatic partial view on an enlarged scale of the chain anchorage assembly of FIGS. 1 and 2;

Figure 4A:
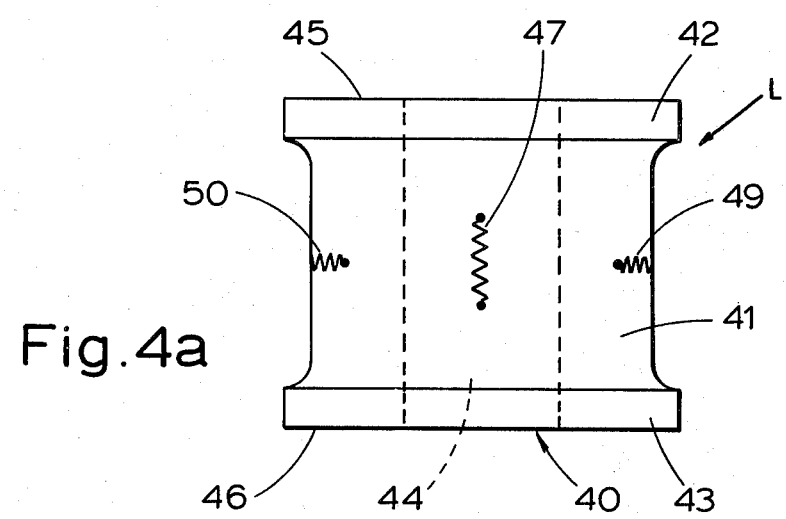
FIGS. 4a and 4b are side and end views of a load cell transducer used in the assembly of FIG. 3.

With reference to FIGS. 1 and 2, the indicated fork lift truck a has a mast assembly 1 comprising a generally U-shaped bottom mast section 2 having parallel legs 3 and 4 of channel section secured to base member 5. The bottom mast section 2 is attached, with its axis substantially vertically, to the chassis of the fork lift truck. A top mast section 6 of inverted U-shape has parallel legs 7 and 8 adapted to slide within the channel section legs 3 and 4, respectively, of the bottom mast section 2. The legs 7 and 8 are also of channel section, and are secured to a top member 9.

An hydraulic ram 10 has a cylinder 11 mounted on the base member 5 and a piston rod 12 connected to the top member 9, and is effective when operated to position the top mast section 6 with respect to the bottom mast section 2 between a lower limit position in which the top mast section 6 is substantially wholly housed within the bottom mast section 2 and an upper limit position in which the greater part of the top mast section 6 projects above the top of the bottom mast section 2, thus varying the total height of the mast between minimum and maximum limits.

A carriage assembly 13 for the attachment of a fork B or other load engaging member comprises a plate-like member 14 disposed adjacent and parallel to a face of the mast assembly 1. Brackets 15 and 16 secured to the member 14 project from it towards the opposite face of the mast assembly 1 parallel and adjacent respectively to the legs 7 and 8 of the top mast section 6. Mounted on the bracket 15 are rollers 17 and 18 lying within the channel of the leg 7. Similar rollers 19 and 20 mounted on the bracket 16 lie within the channel of the leg 8. The rollers 17 and 18, and 19 and 20, co-operate with the sides of the respective channels of the legs 7 and 8 to guide the carriage assembly 13 for motion parallel to the axis of the mast assembly 1.

Carriage support chains 21 and 22 pass over respective sprockets 23 and 24 journalled in trunnions attached to the top member 9 of the top mast section 6 and are each secured at one end to the carriage assembly 13 and at the other end to an anchor member 25 secured to the bottom mast section 2 on the side opposite to the carriage assembly 13.

With reference to FIG. 3, the anchor member 25 comprises an L-section girder secured (e.g. by welding) to the legs 3 and 4 of the bottom mast section 2, so that a flange 26 of the anchor member 25 projects horizontally outward from the plane of the legs 3 and 4.

Eye-bolts 27 and 28 are secured to the ends of the chains 21 and 22 by respective pins 29 and 30. The shanks of the eye-bolts 27 and 28 pass through respective clearance holes 31 and 32 in the flange 26. Load cell transducers 33 and 34 (of a type described hereinafter with reference to FIG. 4) are fitted over the shanks of the eye-bolts 27 and 28 between the underside of the flange 26 and respective washers 35 and 36 and retaining nuts 37 and 38. In supporting the carriage assembly 13 and any load carried on it, the pull on the chains 21 and 22 exerts compressive forces on the load cell transducers 33 and 34.

Figure 4B:
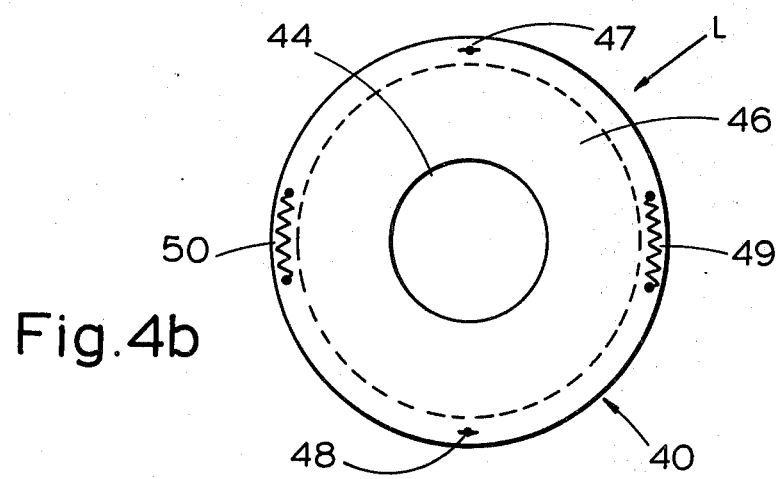

With reference to FIGS. 4a and 4b, a load cell transducer L suitable for use in an arrangement according to the present invention comprises a generally spool-shaped body 40, suitably of steel, having a central cylindrical portion 41 disposed between end portions 42 and 43 each of diameter somewhat greater than that of the central portion 41. An axial bore 44 has a diameter such that the shank of an eye-bolt (e.g. 27 or 28-FIG. 3) can pass freely through the bore.

At least one resistive strain-gauge element is affixed (as by means of a suitable adhesive for example) to the outer surface of the portion 41 in a position such that the element is responsive to compressive forces applied between the end surfaces 45 and 46 of the load cell transducer. Preferably, two similar strain-gauge elements 47 and 48 are affixed symmetrically to the central portion 41 so as to be responsive to compressive forces and two further elements 49 and 50 are affixed so as to be unaffected by compressive forces. The strain-gauge elements 47 to 50 are connected in a well-known bridge arrangement such that the degree of unbalance of the bridge is a measure of the magnitude of compressive forces applied across the end surfaces 45 and 46 of the load cell transducer. Since all four strain-gauge elements will be equally affected by changes in temperature, the output of the bridge arrangement is substantially independent of temperature.

The central portion 41 of the load cell transducer may be provided with a protective sheath, e.g. of rubber or plastics material, which may be moulded in place. The outer diameter of the protective sheath may equal the diameter of the end portions 42 and 43.

Figure 5:
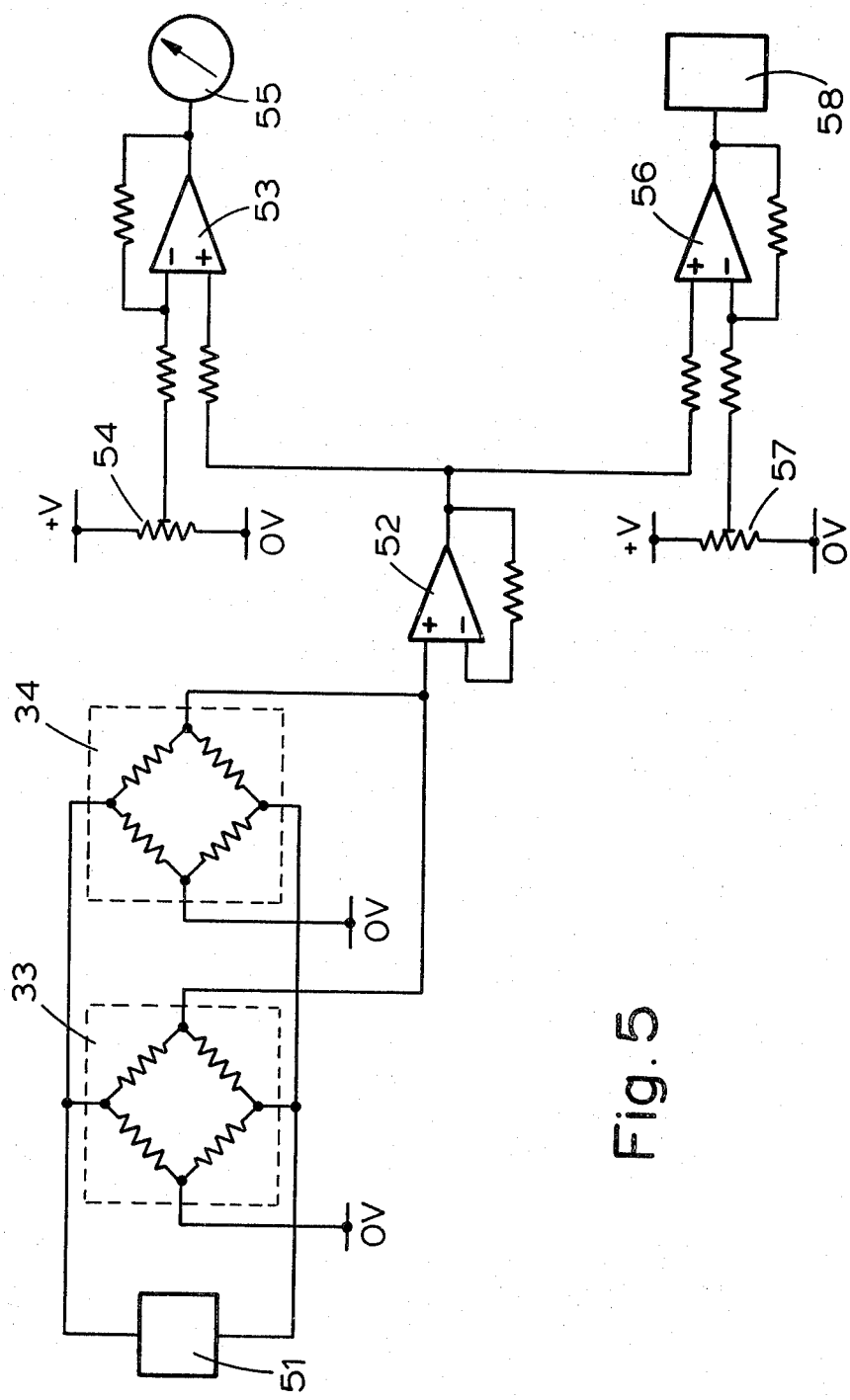
FIG. 5 is a circuit diagram of the electrical part of a load measuring system according to the invention.

With reference to FIG. 5, the load cell transducers 33 and 34 are energised by a stabilised power supply 51 connected across corresponding diagonally-opposite corners of their respective strain gauge bridges. The outputs of the transducers 33 and 34 are connected in parallel to an input of a stabilised summing amplifier 52 which produces an output signal representative of the sum of the compressive forces acting on the transducers 33 and 34, and hence representative of the sum of the tensions in the carriage support chains 21 and 22 (FIG. 3). Consequently, this output signal from the amplifier 52 is a measure of the gross weight suspended by the chains 21 and 22; that is, the sum of the weights of the carriage assembly 13, of the fork B and of any load being carried.

The output of the amplifier 52 is connected to a first input of a difference amplifier 53. A potentiometer 54 connected across a stabilised reference voltage supply (+V, OV) has its slider connected to a second input of the amplifier 53 and is preset to produce a signal representative of the (constant) weight of the carriage assembly 13 and the fork B. The amplifier 53 therefore produces an output signal which is representative of the weight of the load alone. A meter 55 calibrated in terms of load weight is connected to the output of the amplifier 53.

The output of the amplifier 52 is also connected to a first input of a difference amplifier 56. A potentiometer 57 connected across the reference voltage supply (+V, OV) is preset to produce at its slider a signal representative of the maximum safe load which may be sustained by the chains 21 and 22. The slider of the potentiometer 57 is connected to a second input of the amplifier 56. It will be apparent that when the load sustained by the chains 21 and 22 is below the safe limit, the amplifier 56 will produce an output signal of one polarity, but when the load exceeds the safe limit the output will be of the opposite polarity. An alarm circuit 58 connected to the output of amplifier 56 is effective to produce an audible and/or visual warning when the amplifier output assumes the said opposite polarity.

Although the invention has been described with reference to a particular embodiment, it is not so limited, and various modifications are possible within the scope of the invention. In particular, instead of providing load cell transducers at the end of the carriage support chains anchored to the mast, the cells may be provided at the carriage assembly end of the chains. The carriage assembly may be supported by a single chain, in which case only one load cell transducer is provided.

It is found that minimal changes to existing fork lift trucks are necessary when installing a load measuring arrangement according to the invention. At the most, it may be necessary to replace existing eye-bolts with bolts having longer shanks in order to accommodate the load cell transducers but it has also been found that the existing bolts are often long enough.

What we claim is:

1. An arrangement for measuring the weight of a load being carried by a fork lift truck or other load-handling device having a fork or other load engaging member mounted on a carriage supported and arranged for movement parallel to the axis of a substantially vertical mast of the device, which comprises at least one flexible carriage support member, one end of said support member being secured to a first anchor member fixed in relation to the mast and the other end of said support member being secured to a second anchor member fixed to the carriage, at least one anchor member having an opening therethrough; a securing member associated with said one anchor member and having a central portion passing through the opening in said one anchor member, a first end portion adapted to be connected to one end of the flexible support member on one side of the anchor member, and a second end portion having a cross-section greater than that of the opening and positioned on the other side of the anchor member; a load cell transducer located between said second end portion and said other side of the anchor member and responsive to measure the compressive forces exerted between the securing member and the anchor member; and means responsive to the resulting load cell transducer measurement to provide an indication of the weight of the load being carried.

2. An arrangement according to claim 1, in which the load cell transducer comprises a generally cylindrical body having an axial bore and oppositely disposed end faces, the central portion of the securing member passing through the bore with one end face of the cylindrical body bearing against said other side of the anchor member and the other end face of the cylindrical body bearing against said second end portion of the securing member, and resistive strain-gauge elements affixed to the cylindrical body in such positions as to be responsive to compressive forces applied to the end faces of said body.

3. An arrangement according to claim 1 or 2, in which the securing member comprises an eye-bolt and nut assembly, the flexible support member being attached to the eye of the bolt, and the nut comprising said second end portion of the securing member.

* * * * *